United States Patent [19]

Edwards et al.

[11] Patent Number: 4,646,596
[45] Date of Patent: Mar. 3, 1987

[54] MACHINE TOOLS

[76] Inventors: Walter C. Edwards, 6 Badby Leys, Rugby, Warwickshire; Robert J. H. Winterbottom, 4 Manor Court, Twyford, Near Bicester, Buckinghamshire, both of England

[21] Appl. No.: 792,170

[22] Filed: Oct. 25, 1985

Related U.S. Application Data

[63] Continuation of Ser. No. 538,194, Oct. 3, 1983, abandoned, which is a continuation-in-part of Ser. No. 283,036, Jul. 13, 1981, abandoned.

[30] Foreign Application Priority Data

Jul. 12, 1980 [GB] United Kingdom ................ 8022860

[51] Int. Cl.$^4$ ............................................. B23B 5/24
[52] U.S. Cl. ........................................ 82/19; 82/2 B
[58] Field of Search ............................ 82/19, 2 B, 1.3; 51/123 G

[56] References Cited

U.S. PATENT DOCUMENTS

| | | | |
|---|---|---|---|
| 2,000,586 | 5/1935 | Foerster et al. | 51/103 |
| 2,782,669 | 2/1957 | Brandenberger | 82/19 |
| 2,792,763 | 5/1957 | Whitfield | 90/3 |
| 2,850,851 | 9/1958 | Graf | 51/123 G |
| 2,932,227 | 4/1960 | Koch et al. | 82/19 |
| 3,135,149 | 6/1964 | Ernestmegel et al. | 82/19 |
| 3,361,018 | 1/1968 | Druckman | 82/24 |
| 3,680,415 | 8/1972 | Takano et al. | 82/19 |
| 3,688,612 | 9/1972 | Haruta | 82/19 |
| 3,744,355 | 7/1973 | Flisch | 82/19 |
| 3,878,761 | 4/1975 | Makowski | 90/13.9 |
| 3,978,745 | 9/1976 | Okamoto et al. | 82/2 B |
| 4,058,035 | 11/1977 | Flisch | 82/2 B |
| 4,250,779 | 2/1981 | Feller et al. | 82/21 B |
| 4,255,991 | 3/1981 | Lambert | 82/2 B |
| 4,282,784 | 8/1981 | Feller et al. | 82/19 |
| 4,314,492 | 2/1982 | Feller et al. | 82/18 |
| 4,359,679 | 11/1982 | Fujoka | 82/2 B |
| 4,366,543 | 12/1982 | Feller et al. | 82/2 B |

FOREIGN PATENT DOCUMENTS

| | | |
|---|---|---|
| 2427826 | 1/1976 | Fed. Rep. of Germany . |
| 2732354 | 7/1977 | Fed. Rep. of Germany . |
| 1441057 | 4/1966 | France . |
| 829824 | 3/1960 | United Kingdom . |
| 1062818 | 3/1967 | United Kingdom . |
| 1328114 | 8/1973 | United Kingdom . |
| 1344386 | 1/1974 | United Kingdom . |
| 1352351 | 5/1974 | United Kingdom . |
| 1388769 | 3/1975 | United Kingdom . |
| 1461321 | 1/1977 | United Kingdom . |
| 1492329 | 11/1977 | United Kingdom . |
| 1499812 | 2/1978 | United Kingdom . |

*Primary Examiner*—Lowell A. Larson
*Assistant Examiner*—Jerry Kearns
*Attorney, Agent, or Firm*—Leydig, Voit & Mayer

[57] ABSTRACT

A machine tool for machining rotating workpieces at high rotational speeds and, in particular, with multiple tool movements within a revolution of the workpiece, comprises a low-inertia high-torque motor having an output shaft and a tool holder mounted for movement relatively to the motor. A cam or other single element connection drivable connects the output shaft and the tool holder and the motor can be operated by control apparatus to so oscillate the output shaft that the tool is moved rapidly back and forth in phase with the output shaft oscillation and in correspondence with the rotation of the workpiece to perform required machining movements.

45 Claims, 14 Drawing Figures

 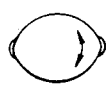 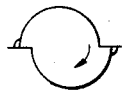 
FIG.5A.  FIG.5B.  FIG.5C.  FIG.5D.
FIG.5E.
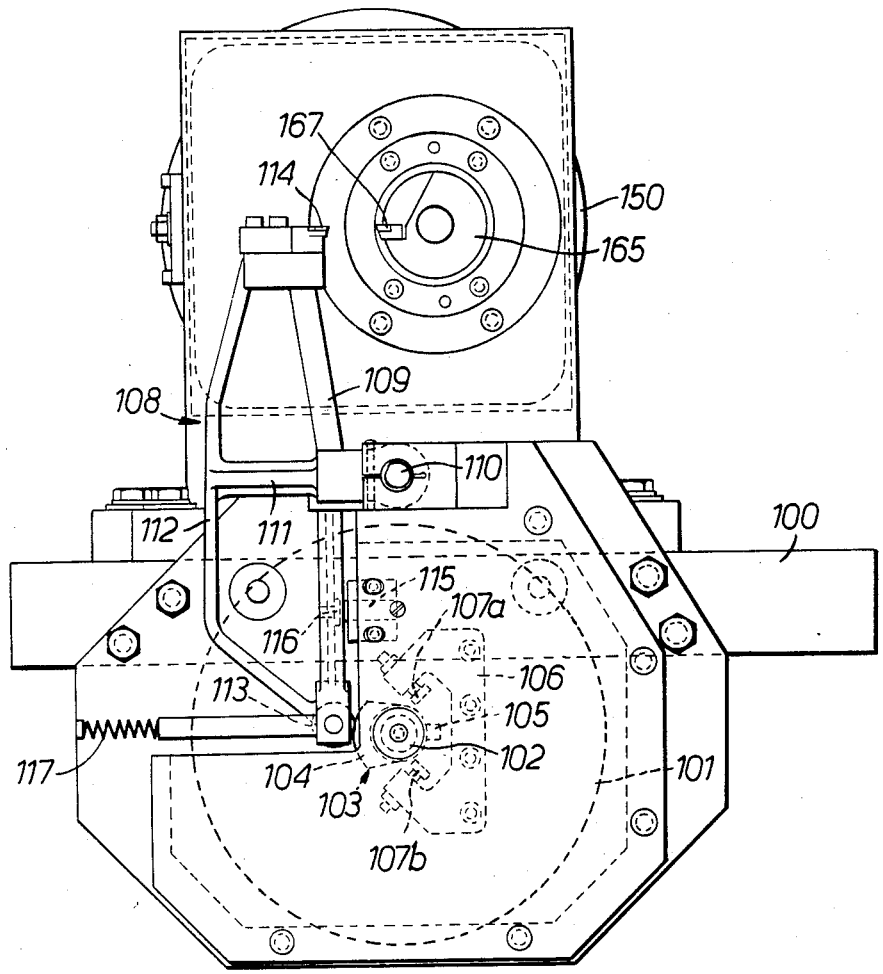
FIG. 6.

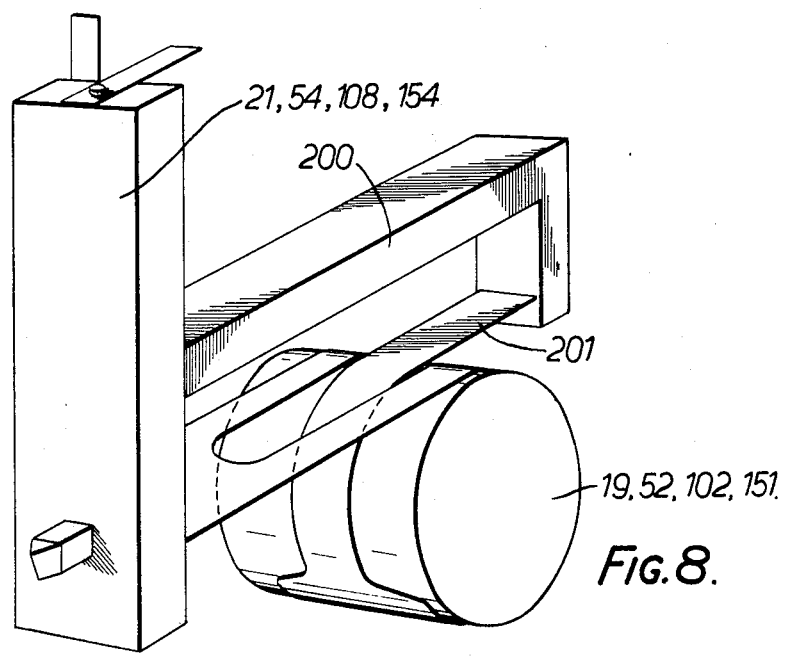

MACHINE TOOLS

This application is a continuation of application Ser. No. 538,194, filed 10/3/83, now abandon, which is a continuation in part of application Ser. No. 283,036, filed 7/13/81 now abandon.

BACKGROUND TO THE INVENTION

1. Field of the Invention

The invention relates to machine tools for machining rotating workpieces.

In recent years there has emerged a need to machine workpieces to non-uniform shapes on a production basis, with the usual requirements of a high accuracy of finish and a maximum speed of production. Such a requirement exists, for example, in the field of production of pistons, piston rings and bearings for internal combustion engines. In the past, many pistons and piston rings produced on a commercial scale have been generally cylindrical while bearings have been either cylindrical or generally flat. It has recently been discovered, however, that the performance of pistons, piston rings or bearings can be improved substantially by shaping the working surface. For example, the performance of a piston and of an engine including such a piston can be improved by barrelling the piston so that it has a maximum diameter intermediate its ends and minimum diameters at its ends. Additionally or alternatively, this performance can also be improved by making the piston non-circular, for example oval or elliptical or by providing other non-uniform features. In general, the exact shape of a piston, piston ring or bearing required to maximise the performance of a particular engine to maximise the performance cannot be predetermined and it is necessary to test a number of alternative configurations in order to optimise performance. In addition, once an optimum configuration has been found, it is necessary to produce the item concerned in substantial quantities.

There has thus emerged a requirement for a machine tool which is capable of machining workpieces rapidly and accurately to have required non-uniform profiles. It will be appreciated that such a machine must have the capability of altering the tool position a number of times within a revolution, if it is to machine oval and elliptical profiles and must be able to do this at high speeds, for example, with the workpiece rotating at 1000–3000 rpm so necessitating accurate tool movements measured in microseconds. In effect, therefore, the tool must be able to be oscillated at high frequencies. In addition, the machine tool must be able to be adapted readily to machine differing profiles.

2. Review of the Prior Art

These requirements are not met by a conventional machine tool such as is shown in British Patent Specification No. 829,824 and which comprises a tool holder movable relatively to the rotating workpiece in directions parallel to and transverse to the axis of rotation of the workpiece by means of a servo system including respective lead screws extending between associated nuts fixed on a conventional tool slide and associated drives for the lead screws such as a motor or a manually operable handle. Such tool holding slides have a wide range of movement, for example a maximum movement of from 250 mm to 6500 mm and can apply a wide range of cutting forces up to a high maximum cutting force which may, for example, be about 1100 kg. They are thus capable of performing many machining tasks.

However, because of the size and inertia of the slide and the lag and backlash inherent in the lead screw and motor drive system, such an arrangement has a very narrow bandwidth and thus the tool cannot be moved relatively to the workpiece rapidly by small increments of distance. Thus, such a tool does not meet the requirements for machining and producing non-uniform workpieces at commercial rates.

As well as such conventional machine tools, there are more specialised machine tools of which three categories will now be discussed: grinding machines, that so called "Swiss lathes" and cam follower machines.

An example of a grinding machine is shown in British Patent Specification No. 1,499,812 (Cranfield Institute of Technology). In this arrangement, the workpiece is shaped by a motor-driven grinding wheel which is mounted for movement by a lead screw driven by a motor. Although the servo system of this Specification has a maximum cutting force of 450 kg and a bandwidth which is wider than the bandwidth of a machine tool of the conventional type referred to above, the weight, and thus the inertia of the motor which drives the grinding wheel and the lag and backlash inherent in the continued use of a lead screws still prevents the oscillation of the tool necessary to produce non-uniform profiles at exceptionally high rates.

Examples of the so-called 'Swiss lathe', are shown in U.S. Pat. Specifications Nos. 3,680,415 and 3,688,612. In the Swiss lathe, a number of tools surround the workpiece and are moved into and out of engagement with the workpiece by respective cams carried on a common shaft and driven by a stepping motor through a gearbox. There is a clutch system provided which allows any tool to be drivingly engaged with the associated cam to move the tool into position in accordance with positioning commands.

As with a conventional machine tool, however, this system is designed to move the tool into a predetermined machining position and is not capable of moving the tool within a revolution of a workpiece rotating at high speed. This is reflected in the construction of the tool moving system where the presence of the gearbox, the number of cams on a common shaft and the clutch system make oscillating movements impossible.

An example of a cam follower machine is shown in British Patent Specification No. 1,461,321 (Regie National Des Usines Renault). In this system, there is provided a rotating cam which has a shape which is the shape of the desired final profile of the workpiece. The cam is contacted by a servo system formed by a cam follower whose motion is transmitted to the tool by a linkage system. Although such a tool can cut non-uniform workpieces at rotational speeds which are higher than the above-mentioned conventional machine tool, there is an upper limit to the rotational speed of the cam and the workpiece due to the fact that, at high speeds, the follower will leave the cam surface, thus causing errors in the profile of the workpiece. This tendency of the follower to leave the cam prevents certain non-uniform shapes being machined, for example, shapes which have rapid changes of profile. The maximum cutting force of such a system is low although the bandwidth is higher than a conventional machine. In addition, a fresh cam has to be prepared if a changed workpiece profile is required. This is both time consuming and costly since such cams are generally made using special precision equipment.

All these machine tool systems thus suffer from the disadvantage that they are unable to move the tool position at very high speed because of inherent lag and inertia in the servo system caused in general by the weight or size of the tool holder and the transmission system between the tool holder drive and the tool holder.

There exists, therefore, a need for a machine tool system which can machine workpieces to non-uniform profiles at very high speeds.

BRIEF DESCRIPTION OF THE DRAWINGS

The following is a more detailed description of three embodiments of the invention, by way of example, reference being made to the accompanying drawings, in which:

FIGS. 5A, 5B, 5C, 5D and 5E are shematic cross-sections of five different non-cylindrical internal bearing surfaces for production by the machine tool of FIG. 4, FIG. 6 is a side elevation of a first carriage, tool holder and motor of a third machine tool, FIG. 8 is a diagrammatic perspective view of an alternative connection between a motor and a tool holder of the machine tools of FIGS. 1, 4, 6 and 7.

DESCRIPTION OF THE PREFERRED EMBODIMENTS

Figure 1:
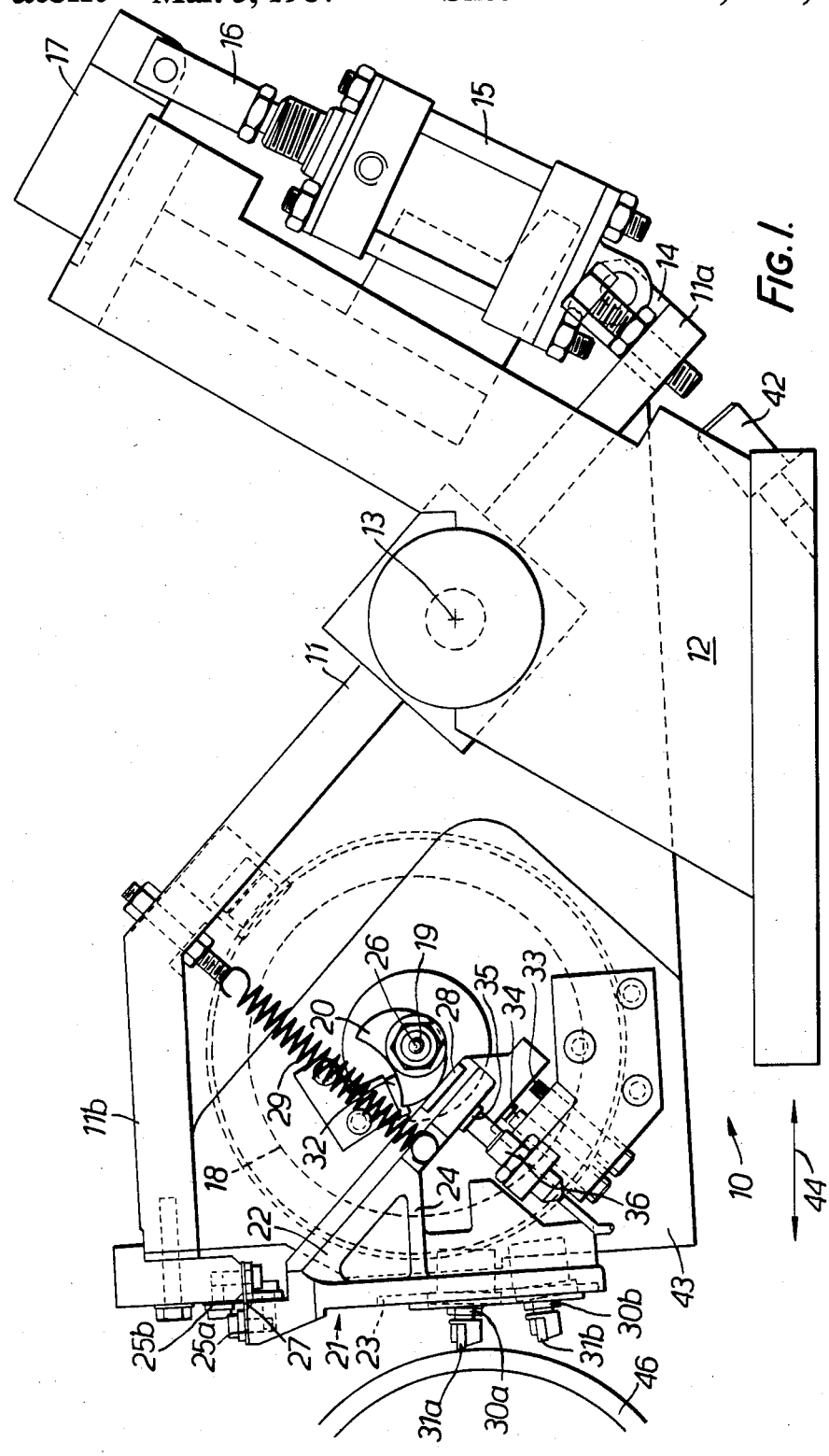
FIG. 1 is a side elevation of a first machine tool.

Referring to FIG. 1, the first machine tool comprises a tool carriage 10 formed by a lever 11 mounted on a support 12 for pivotal movement about an axis 13. A portion 11a of the lever 11 to one side of the lever axis 13 carries a lug 14 which is pivotally connected to an actuator 16 whose movable member 15 is connected to an extension 17 of the support 12 so that operation of the actuator 16 indexes the lever 11 between two positions, for a purpose to be described below. A first stop 42 is provided on the support 12 to limit pivotal movement of the lever 11 in one sense and a second stop (not shown) is provided to limit pivotal movement of the lever 11 in an opposite sense.

The portion 11b of the lever 11 to the other side of the lever axis 13 carries a mounting plate 43 to which is connected a low-inertia high-torque electric motor 18 having a printed circuit armature connected to an output shaft 19 whose rotational axis 26 is parallel to the pivot axis 13. A crescent-shaped cam 20 is mounted on the output shaft 19. A tacho-generator (not shown) is also mounted on the output shaft 19 to provide a signal corresponding to the rotational velocity of the output shaft 19.

A tool holder 21 is formed by two arms 22, 23 rigidly connected together at their ends and forming an acute angle therebetween with a support strut 24 extending between the arms 22, 23 intermediate their ends. Two pairs of flexible strips 25a, 25b are connected between the tool holder, adjacent the junction of the arms 22, 23 and the end of the lever portion 11b and the strips 25a, 25b of each pair are arranged normal to one another about a common axis 27 which is parallel to the rotational axis 26 of the motor 18. This provides a pivot axis for the tool holder 21 relatively to the carriage 10.

One arm 22 carries, towards the free end thereof, a hardened plate 28 which is closely adjacent the output shaft 19 and which is pulled against the cam 20 by a tensioned coil spring 29 connected between the arm 22 and the base lever 11. The other arm 23 carries two mountings 30a, 30b each of which holds a respective tool 31a, 31b, for example a rough cutting carbide tool 31a and a finishing diamond tool 31b.

A first stop 32 is provided on the lever 11 to limit movement of the motor output shaft 19, and thus movement of the tool holder 21, in one direction. A resilient cushion 33 and a second stop 34 are also attached to the mounting plate 43 for engagement with the tool holder arm 22 to damp oscillation of and to limit movement of the tool holder 21 in the opposite direction.

The arm 22 also carries a target 35 for a position transducer 36 which is attached to the mounting plate 43 and which produces a signal which is a function of the distance between the position transducer 36 and the target 35 and is thus also proportional to the position of the tool holder 21 relatively to the carriage 10.

The carriage 10 is mounted for movement by lead screws 41a in directions parallel to and normal to the motor output shaft axis 26, the latter movement being in the direction of the arrow 44 in FIG. 1. The lead screws may be rotated by motors 41b or by manually rotatable handles (not shown).

The machine tool also includes a workpiece holder 40a for holding and rotating a workpiece about an axis parallel to the motor axis 26 so that the tools 31a, 31b move in a plane normal to the axis of rotation of the workpiece. The workpiece 40a holder includes a motor 40b for rotating the workpiece and a sensor 40 (FIG. 2) is provided for producing an electrical signal corresponding to the angular position (0-position) of the workpiece during rotation. The carriage 10 is provided with a position transducer 41 (FIG. 2) which provides a signal corresponding to the position of the carriage relatively to the workpiece in a direction parallel to the axis of rotation of the workpiece (z-position).

Figure 2:
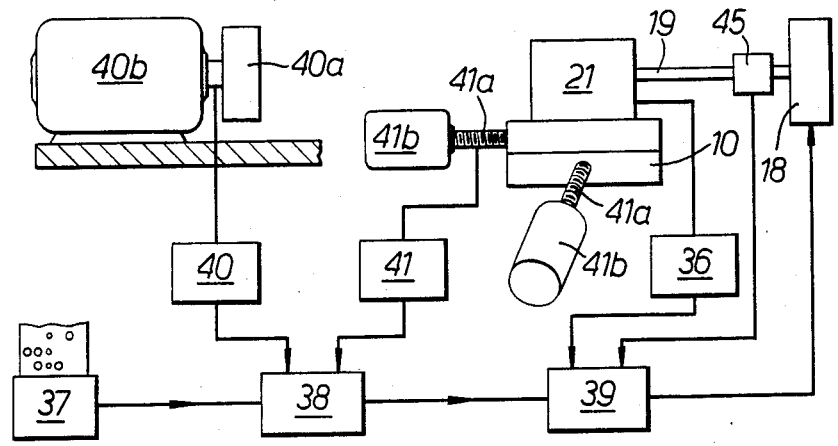
FIG. 2 is a block diagram of a control apparatus for controlling the machine tool of FIG. 1, FIGS. 3A, 3B and 3C are schematic views of parts of three different thrust bearing faces for production by the machine tool of FIGS. 1 and 2.

Referring next to FIG. 2, the control apparatus comprises a punched tape reader and input keyboard 37 connected to a profile generator 38 which has inputs from the workpiece angular position sensor 40 and from the carriage transducer 41. The profile generator 38 has an output connected to a closed loop controller 39 which also receives, as inputs, feedback signals from the position transducer 36 and from a tacho-generator 45 on the motor output shaft 19. The output of the closed loop controller 39 is connected to the motor 18. The operation of this apparatus will be described below.

The machine tool of FIG. 1 is operable to perform a turning operation on an exterior generally cylindrical surface of the workpiece 46 (FIG. 1) mounted in and rotated by the workpiece holder. The machine tool is capable of turning such workpieces at high speed to provide a finished workpiece having a slightly noncircular cross-section so that the radius of the workpiece varies around the periphery of the workpiece in a plane normal to the axis of the workpiece and also has differing cross-sections in different planes normal to the axis of the workpiece, and spaced parallel to one another along the axial length of the workpiece. Accordingly, the punched tape reader 37 is fed with digital profile data which define the required radius at angular intervals around the periphery of the workpiece and at a number of axial locations along the workpiece to provide a required final workpiece profile. In practice, the required radius is generally specified as drops from a datum radius at, for example, 5° intervals around the workpiece at each axial position of the workpiece for which such a line of data is given. Of course, if the workpiece is symmetrical about a plane including the workpiece axis or about two such planes mutually at right angles, then drops for only 180° or 90° respectively are required and are repeated twice or four times respectively per revolution of the workpiece.

In one example of the machine tool of FIG. 1 for turning light alloy workpieces, the maximum movement of the tool is 0.75 mm and, in this case, the weight of the tool holder 21 and tools 31a, 31b is 0.67 kg, the maximum cutting force 2.25 kg and the workpiece is rotated at a speed of about 3000 revolutions per minute.

In operation, a workpiece 46 to be turned is held in the workpiece holders and rotated at a required speed. The tool to be used, which initially is the rough cutting carbide tool 31a, is selected by operation of the actuator 16 which moves the lever 11 against the first stop 42 or the second stop (not shown) to bring a respective one or other of the tools 31a, 31b into an operative position and to hold the remaining tool in a non-operative position. A tape carry digital profile data for the finished workpiece in the form of drops at spaced angular positions for a succession of axial positions is fed into the profile generator 38 via the tape reader 37. The profile generator 38 thus provides drops at space 0-positions of the workpiece 46 and at a number of spaced z-positions along the axis of rotation of the workpiece 46. The distance between consecutive z-positions may be 0.1 mm.

Since the digital data comprises drops referenced to a datum position of the carriage 10 in radial and axial directions relative to the workpiece and the carriage 10 is moved to the datum radial position and is then moved in the z-direction towards the workpiece 46. When the carriage position transducer 41 signals to the profile generator 38 that the carriage 10 is in the datum z-position, successive 0-position signals from the workpiece angular position sensor 41 cause the profile generator 38 to feed a corresponding succession of drops for those 0-positions to the closed loop controller 39. The closed loop controller 39 receives the feedback signals from the position transducer 36 and from the tacho-generator 45 and produces a control current.

On receipt of the current, the motor 18 rotates the output shaft 19 through an angle which causes the cam 20 to rotate to move the tool holder 21 either by the force of the cam 20 against the action of the spring 29, on rotation of the cam 20 in an anti-clockwise direction as viewed in FIG. 1, or under the action of the spring 29, on rotation of the cam in a clockwise direction as viewed in FIG. 1. In either event, the tool holder 21 is moved in phase with the output shaft 19 in a direction lying in a plane normal to the axis of the output shaft 19 and normal to the axis of rotation of the workpiece. This moves the tool 31a, 31b by the required drop. The maximum rotation of the shaft is always less than a revolution. Indeed, the maximum movement of the tool 31a or 31b may be achieved by a rotation of the shaft 19 less than 10°, for example by 7.5°.

Subsequent drop signals are processed in a similar manner to produce movements of the tool 31a or 31b towards and away from the workpiece 46. It will be appreciated that at a workpiece rotational speed of 3000 r.p.m. the output shaft 19 will, to produce a quasi-circular workpiece 46 symmetrical about a single plane including the workpiece axis, oscillate at 50 cycles a second with the tool holder thus reversing direction toward and away from the workpiece 50 times a second to give a required workpiece profile, or at 100 cycles a second if the workpiece 46 is symmetrical about two mutually inclined planes including the workpiece axis. This is made possible by the light weight and low moment of inertia of the tools 31a, 31b, tool holder 21, cam 18, motor output shaft 19 and motor armature. For example, their combined moment of inertia may be $1.64 \times 10^{-5}$ kg. m.sec$^2$. This gives a bandwidth of about 0-380 Hz.

In addition, the fact that the tool holder 21 is directly in contact with the cam 20 leads to no or substantially no lag in the transmission of shaft movement to the tool holder 21. Further, the fact that the output shaft 19 is driven by a high-torque low-inertia motor 18 which performs only a part of a revolution to achieve the required movement of the tool holder 21 allows very fast response times. For example, the torque produced by the motor 18 may be 0.9 Nm. The pivotal mounting of the tool holder 21 by the flexible strips 25a, 25b gives substantially no frictional losses in the mounting and this also contributes to the rapid response time and negligible backlash of the machine tool. The high speeds at which the turning operation takes place give an improved surface finish on light alloy workpieces and allow rapid throughput of workpieces.

As the carriage 10 moves in the z-direction, the position sensor 41 feeds corresponding z-position signals to the profile generator and when the carriage 10 reaches a z-position which corresponds to the next z-position for which the profile generator 38 has drop data, the appropriate drop signals are fed to the closed loop controller 39. These steps are repeated until the turning operations defined by the profile commands have all been performed. Next, the actuator 16 may be operated to pivot the lever 11 to bring the finishing diamond tool 31b into an operative position and the programme repeated to perform a finishing operation on the workpiece 46, with the finishing tool 31b moving in an opposite axial sense along the workpiece 46.

The cam 20 is prevented from over-rotating by the second stop 34 which also prevents the tool holder 21 from damaging the position transducer 36. When the machine tool stops operating, the spring 29 pulls the tool holder 21 against the cam 20 to move the tool holder 21 to a parked position in contact with the first stop 32 thus limiting the extent of this movement.

The tape reader is combined with an input keyboard and this allows alteration of the profile defined by the digital data held in the profile generator 38 between workpieces. For example, a command can be entered to alter the programmed drops for a particular axial length of the workpiece. This allows immediate alteration of a workpiece profile defined by digital data.

The machine tool described above with reference to FIGS. 1 and 2 can also be used for performing a facing operation on a workpiece surface lying generally in a plane normal to the axis of the workpiece. Such surfaces can be required to have a distance from a plane normal to the axis of the workpiece which varies around the circumference of the surface.

In this case, the carriage 10 and the parts carried on the carriage 10 are mounted so that the motor axis 26 and the tool holder pivotal axis 27 lie in planes normal to the rotational axis of the workpiece and so that the tool moves in a plane parallel to the rotational axis of the workpiece. In addition, the carriage 10 is movable in a direction parallel to the motor axis 26 to traverse the face of the workpiece and in a plane normal to the motor axis 26 to bring the tool to a datum position. Finished profile digital data on a punched tape are fed to the tap reader 37 in the form of axial displacements from a datum plane normal to the axis of rotation of the workpiece at spaced angular positions around the workpiece and at a succession of radial distances from the rotational axis of the workpiece. A control current for the motor 18 is generated as described above with reference to FIG. 2 and the tool holder 21 is moved as described above with reference to FIGS. 1 and 2 to perform the required axial displacements. Radial movement of the tool is achieved by traversing the carriage 10.

As when turning, the machine tool of FIG. 1 allows complex facing operations to be performed very rapidly and accurately for the same reasons as explained above with reference to the operation of the machine tool as a turning machine. Such facing operations can inlude the machining of complex shapes of thrust bearing face. A thrust bearing face is of generally annular shape and presents an annular surface for taking axially directed thrust. In a very simple form, the annular face lies in a plane normal to the axis of the bearing surface but in more complex bearings, portions of the face are tapered, i.e. they are spaced from such a plane by a distance which varies with the angular position around the bearing and/or the radial distance from the axis. Segments of three such complex thrust bearing faces 47, 48, 49 are shown in FIGS. 3A, 3B and 3C.

The three faces 47, 48, and 49 are each shown with respective portions 47a, 48a and 49a which lie in a plane normal to the axis of the thrust bearing and with three tapered portions 47b, 48b and 49b which are defined in the Figures by two grids of intersecting lines, 47c, 47d; 48c, 48d and 49c, 49d. Each line 47c, 48c or 49c of one set of lines joins points on the surface which are equidistant from a plane normal to the axis of the bearing while each line 47d, 48d or 49d of the other set of lines joins points on the face which are equidistant from the axis of the bearing.

Figure 3A:
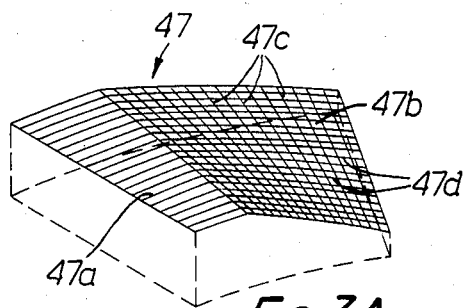
Figure 3B:
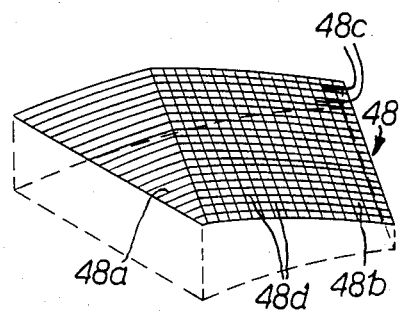
Figure 3C:
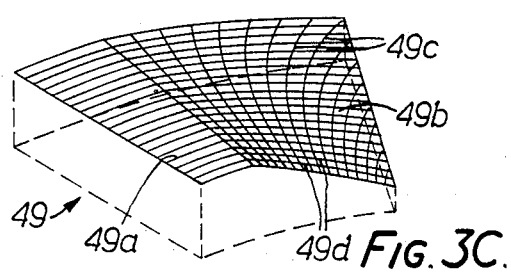

Thus the face 47 of FIG. 3A has radially extending lines of taper while the face 48 of FIG. 3B has parallel lines of taper and the face 49 of FIG. 3C has lines of taper having a complex curved interrelationship. By feeding the punched tape reader 37 with digital profile data which defines the required distance from a plane normal to the bearing axis at angular intervals of around the bearing face and at a number of radially spaced positions, a required bearing face profile can be machined by the machine tool of FIG. 1 in a single operation with both the planar portions 47a, 48a and 49a and the tapered portions 47b, 48b and 49b being machined simultaneously with the great accuracy and speed.

Formerly, only the simpler of such complex bearing faces could be produced and then only by use of a succession of time consuming milling operations each of which had to be accurately made. Shapes such as the compound taper were generally impossible to make or at least impossible to make with any degree of accuracy or on a commercial scale.

Figure 4:
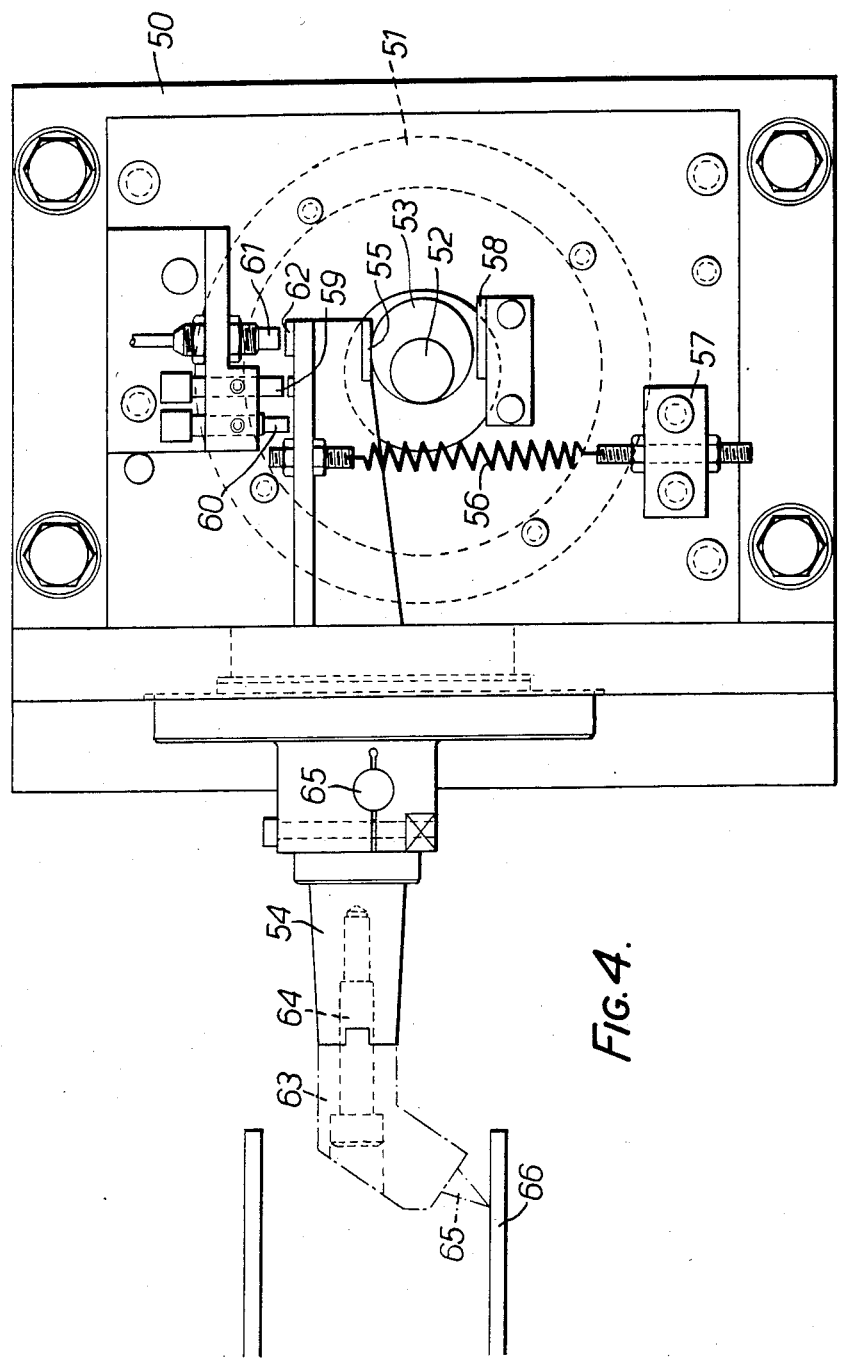
FIG. 4 is a plan of a carriage, tool holder and motor of a second machine tool.

Referring next to FIG. 4, the second machine tool comprises a carriage 50 to which is bolted a low-inertia high-torque electric motor 51, of the same type as the motor 18 described above with reference to FIG. 1. The motor 51 has an output shaft 52 carrying a circular cam 53 mounted eccentrically on the output shaft 52. A tacho-generator (not shown) is also mounted on the output shaft 52 to provide a signal representative of rotational velocity of the output shaft 52.

A tool holder 54 in the form of a rigid elongate beam is pivotally mounted on the carriage 50 by trunnions 65 carried in low-friction bearings (not shown) on the carriage 50 and located generally intermediate the ends of the tool holder 54. The pivotal axis of the tool holder 54 is parallel to the axis of the output shaft 52. One end of the tool holder 54 is closely adjacent the motor output shaft 52 and carries a hardened plate 55 which is urged against the cam 53 by a tensioned coil spring 56 connected between the tool holder 54 and a mounting 57 on the carriage 50.

A first stop 58 is mounted on the carriage 50 and is arranged at a side of the cam 53 diametrically opposite the hardened plate 55. A second stop 59 is provided on the carriage 50 adjacent the cam-contacting end of the tool holder 54 and has a resilient cushion 60 associated therewith. A position transducer 61 is located adjacent the second stop 59 and co-operates with a target 62 mounted on the tool holder 54 to produce a signal representative of the position of the tool holder 54.

The opposite end of the tool holder 54 carries a tool-carrying head 63 which is removably connected to the tool holder 54 by a screw 64. The tool-carrying head 63 holds the tool 65 in a position inclined to the length of the tool holder 54.

The carriage 50 of FIG. 4 is mounted for movement in the same manner as the carriage 10 described above with reference to FIG. 1. A workpiece holder and the parts associated therewith as described above with reference to FIG. 1 are also provided, as is the control apparatus described above with reference to FIG. 2.

In use, the machine tool of FIG. 4 is for shaping the interior of a bore formed in a workpiece 66 rotated in the workpiece holder about an axis co-axial or substantially co-axial with the bore axis. The axes of the motor output shaft 52 and of the tool holder 54 are arranged in planes normal to the axis of rotation of the workpiece with the tool holder 54 extending into the bore in the workpiece.

A punched tape is fed into the tape reader 37, the tape carrying digital profile data in the form of drops from a datum radius at a succession of angular positions around the interior of the bore and for a succession of axial positions along the bore. Control currents for the motor 51 are generated as described above with reference to FIGS. 1 and 2 and on receipt of such a control current, the motor 51 rotates the motor output shaft 52 to rotate the cam 53. The cam 53 in turn moves the plate 55, in a direction lying in a plane normal to the output shaft axis, by either pushing against the hardened plate 55 to rotate the tool holder 54 in one sense against the action of the tension spring 56 or by allowing the tension spring 56 to rotate the tool holder 54 in the opposite sense. Feedback signals for the closed loop controller 39 are provided by the tacho-generator and the position transducer 61. When the machine tool is not in operation, the tension spring 56 pulls the cam 53 against the first stop 58.

Since the tool-carrying head 63 is cantilevered from trunnions 65, the tool holder 54 is, in this embodiment, of slightly greater weight than the tool holder 21 of the embodiment described above with reference to FIG. 1 to prevent errors in tool position due to flexing of the tool holder 54. For example, the tool holder 54 may weigh about 1.36 kg.

As with the machine tool described above with reference to FIG. 1, the machine tool of FIG. 4 is able to machine the workpiece rapidly and accurately due to the direct contract between the cam 53 and the end of the tool holder 54 and the motor output shaft 52, as well as the low inertia of the parts, the absence of backlash and the low friction. The fact that the output shaft 52 moves through only an acute angle for each control signal and the corresponding small angular rotation of the tool holder 54 in phase therewith also contribute to the rapid and acurate machining of the workpiece at high oscillatory speeds of the tool 65, for example 50 or 100 cycles per second.

The control system can be programmed to give a wide variety of bore profiles and the input keyboard can be used to vary the mean position of the tool or its amplitude of travel between the machining of successive workpieces. The tool carrying head 63 can be removed to allow replacement of the tool to provide for wearing down of tools or the requirement for a machining operation in which a rough cut is followed by a finishing cut.

For example, the machine of FIG. 4 can be used to machine the inside surface of non-cylindrical bearings. In general, bearing bores are cylindrical and a shaft rotating in the bearing in oil creates a hydrodynamic oil wedge by virtue of the offset rotation of the shaft available as a result of the clearance between the shaft and the bearing bore. At very high speeds and/or where the load on the shaft is light, such an arrangement may cause unacceptable vibration. For this reason, various non-cylindrical bearing surfaces have been developed having internal shapes which endeavour to overcome this problem and some of which are shown in FIGS. 5A, 5B, 5C, 5D and 5E.

The bearing surface of FIG. 5A is generally cylindrical but has two diametrically opposed lobes extending along the length of the bearing. The lobes are formed by depressions in the bearing surface which are of very much smaller radius than the radius of the cylindrical part of the bearing surface. The bearing surface of FIG. 5B is generally in the shape of a lemon with two arcuate shaped portions whose length is less than a semi-circle and whose ends are connected by lobes. The bearing bore of FIG. 5C has two semi-cylindrical portions which are offset relative to one another. The bearing surface of FIG. 5D is generally similar to that of the surface of FIG. 5A but with four lobes disposed equiangularly around the bearing surface. Finally, the bearing surface of FIG. 5E is similar to the bearing surfaces of FIGS. 5A, and 5B but with three lobes equiangularly spaced around the bearing surface. Of course, in any of the bearing surfaces where lobes are provided, they need not be parallel to the axis of the bore but they may be skewed, curved or inclined in any required way with respect of the axis. In addition, dimensions of each lobe or indeed of the bore itself may vary along the length of the bore.

The machine tool described above with reference to FIG. 4 is capable of machining bearing surfaces of FIGS. 5A, 5B, 5C, 5D and 5E in a single machining operation and with great accuracy. The tape reader 37 is fed with profile data which define the required profile of the bearing surface at angularly spaced positions around the bearing surface and at a succession of axially spaced positions along the bearing bore. The accuracy of operation of the machine tool of FIG. 4 allows the lobes to be quickly and accurately machined together with the remainder of the bearing surface.

The bearing surfaces shown in FIGS. 5A, 5B, 5C, 5D and 5E have previously been thought to be impossible to produce or too expensive to produce on a commercial scale.

Figure 7:
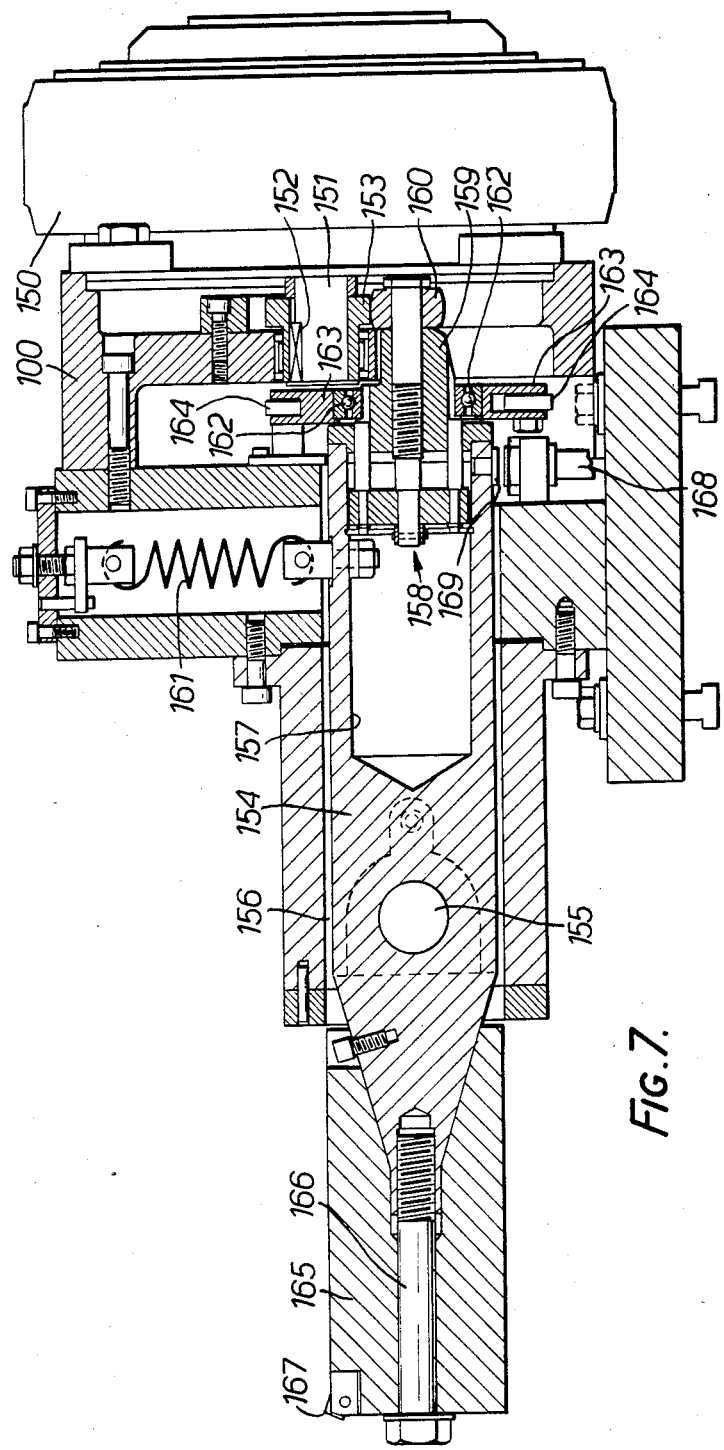
FIG. 7 is a side elevation, partially in section, of a second carriage, tool holder and motor of the machine tool of FIG. 6.

Referring next to FIGS. 6 and 7, the third machine tool shown therein is for both turning and boring of workpieces. The turning part of this machine tool is shown in FIG. 6 and comprises a carriage 100 carrying a low-inertia high-torque motor 101, of the type described above with reference to FIG. 1, and having an output shaft 102 whose axis is parallel to the axis of rotation of the workpiece to be machined. The output shaft 102 carries a cam 103 having a curved lobe 104 to one side of the shaft axis and a projection 105 on the diametrically opposite side of the output shaft 102. A bracket 106 is also mounted on the carriage 100 and holds two spring loaded stops 107a, 107b which are so arranged as to provide respective limits to the rotation of projection 105 in opposite rotational sense.

A tool holder 108 is formed by a rigid framework of members with a central member 109 mounted on the carriage 100 by a pivot 110, a further member 111 connected at one end to the central member 109 at a point adjacent the pivot 110, and a connecting member 112 extending from one end of the member 109 to the free end of the further member 111 and then to the other end of the member 109. This arrangement of members gives a tool holder 108 which is light in weight yet strong and capable of transmitting high forces to a tool.

One end of the tool holder 108 carries a roller 113 which is urged into contact with the curved cam lobe 104 by a compression coil spring 117. The opposite end of the tool holder carries a tool 114 detachable connected to the tool holder 108.

A tacho-generator (not shown) is mounted on the motor output shaft 102 to provide a signal representative of the velocity of the output shaft 102. A position transducer 115 is mounted on the carriage 100 to cooperate with a target 116 on the tool holder 108 to provide a signal representative of the position of the tool holder.

Referring next to FIG. 7, the boring part of the machine tool comprises a low-inertia high-torque motor 150 of the type described above with reference to FIG. 1. The motor 150 is mounted to the carriage 100 and has an output shaft 151 whose outer end is mounted in bearings 152 and which carries a cam 153. The axis of the shaft 151 is parallel to the axis of the output shaft 102 of the turning motor 101 (see FIG. 6).

A tool holder 154 is mounted on the carriage 100 by means of a low friction pivot 155 and has the form of an elongate rigid rod-like member. The tool holder 154 is located in a sleeve 156 provided in the carriage 100 with a radial clearance being provided between the sleeve 156 and the tool holder 154 to allow pivotal movement of the tool holder 154. One end of the tool holder 154 is formed with an axially extending bore 157 into which is inserted an end assembly 158 which comprises a generally cylindrical body 159 located within the bore 157 and a roller 160 at the very end of the tool holder 154. The roller 160 is urged against the cam 153 by a tensioned coil spring 161 connected between the carriage 100 and the tool holder 154. The end assembly is mounted in bearings 162 in a carrier 163 which is connected to the carriage 100 by two pivotal links 164 forming a Watts linkage and providing additional supporting stiffness in a plane normal to the plane of movement of the tool holder 154. The other end of the tool holder 154 carries a tool mounting 165 connected thereto by a bolt 166 to allow a tool 167 on the mounting 165 to be replaced.

A tacho-generator (not shown) is mounted on the motor output shaft 151 to provide a signal representative of shaft velocity. A position transducer 168 mounted on the carriage 100 co-operates with a target 169 on the tool holder 154 to provide a signal representative of the position of the tool holder 154.

The carriage 100 of FIGS. 6 and 7 is mounted for movement in the same manner as the carriage 10 described above with reference to FIG. 1. A workpiece holder and associated parts are also provided as also described above with reference to FIG. 1. The axis of rotation of the workpiece is parallel both to the axis of the output shaft 102 of the turning motor 101 and to the axis of the output shaft 151 of the boring motor 150. The boring tool holder 154 lies generally along the axis of rotation of the workpiece.

A control apparatus is provided which is the same as that described above with reference to FIG. 2 but with the output of the profile generator 38 being connected to two parallel closed loop controllers 39. One controller 39 produces control currents for the turning motor 101 and receives feedback signals from the position transducer 115 and the tacho-generator of the motor 101 and the other controller 39 produces control currents for the motor 150 and receives feedback signals from the position transducer 168 and the tacho-generator of the motor 150.

In use, the machine tool of FIGS. 6 and 7 is for simultaneously turning, by means of the machine tool of FIG. 6, an exterior generally-cylindrical surface of a workpiece mounted in and rotated by the workpiece holder and for shaping, by means of the machine tool of FIG. 7, an interior of a bore formed in the workpiece. A punched tape is fed to the tape reader 37 which carries digital profile data regarding the required exterior and interior profiles of the workpiece. As with the embodiments of FIGS. 1 and 2, the information is in the form of drops from respective datum radii at spaced angular positions around the workpiece and at a succession of axial positions along the workpiece. A control current for either the motor 101 or the motor 150 is generated by the respective closed loop controller as described above with reference to FIGS. 1 and 2.

The turning motor 101, on receipt of a control signal, rotates the associated output shaft 102 to rotate the cam 103. The tool holder 108 thus moves to and fro in a plane normal to the shaft axis under the force exerted thereon by the lobe 104, against the action of the compression spring 117 and as a result of the reaction force on the tool produced by the cutting action, on rotation of the shaft 102 in one sense.

The stops 107a, 107b co-operate with the projection 105 to limit the rotation of the output shaft 104 and the tacho-generator and the position transducer 115 provide respective shaft velocity and tool-holder-position signals to the associated branch of the contol apparatus.

The boring motor 150, on receipt of a contol signal, rotates the associated output shaft 151 to rotate the cam 153. The tool holder 154 pivots about the pivot axis 155 in a plane normal to the shaft axis to pivot either by the force exerted thereon by the cam 153 against the action of the tension spring 161, on rotation of the shaft in one sense, or by the action of the tension spring 161 pulling the roller 160 against the cam 153, on rotation of the output shaft 151 in the opposite sense. The carrier 163 limits pivotal movement of the tool holder 154 and the tacho-generator and the position transducer 168 provide respective velocity and position signals for the associated branch of the control apparatus.

The embodiment described above with reference to FIGS. 6 and 7 is described for turning and boring hard metal workpieces such as steel workpieces. For this reason, the tool holders 158 and 154 may weight 5.5 kg and 4.5 kg respectively, have maximum movements of 3.00 mm and be capable of applying cutting forces of up to 200 kg. The workpiece may be rotated at 500 r.p.m. The bandwidth of the machine tool of FIGS. 6 and 7 may be 0–150 Hz. Even with such hard metals and the need to provide high cutting forces, the machine tool of FIGS. 6 and 7 is capable of machining very accurate profiles which vary around the workpiece interior or exterior surface in a plane normal to the workpiece axis. For example, the tools of this machine tool may reverse direction 16 times a second towards and away from the workpiece surface in synchronism with the rotation of the workpiece. Thus, complex surface profiles can be cut in such metals.

The speed and accuracy of the machining is due to the fact that the moment of inertia of the tool holders 108 and 154 and their associated output shafts 102 and 151 is low, for example $3.69 \times 10^{-4}$ kg.m.sec$^2$. This allows rapid response of the tools. In addition, the ends of the tool holders 108, 154 are closely adjacent the output shafts 102, 151 of their associated motors 101, 150 and are in direct contact with the cams thus ensuring that the transmission of shaft movement to the tool holders occurs without or substantially without lag or backlash.

Referring next to FIG. 8, there is shown an alternative connection between the output shafts 19, 52, 102 or 151 and their associated tool holders 21, 54, 108 or 154. The alternative connection comprises a yoke 200 spanning the output shaft and extending from the tool holders 21, 54, 108 and 154 and a flexible band 201 having the ends thereof attached to opposite end parts of the yoke 200 and passing around the output shaft 19, 52, 102 or 151. The band 201 is tensioned to provide good frictional engagement between the band 201 and the output shaft 19, 52, 102 or 151. On rotation of the output shaft 19, 52, 102 or 151 in one sense, the band 201 is drawn up to one side of the shaft and let out to the other, thus moving the yoke 200 and the tool holder in one direction. On rotation of the output shaft in an opposite direction, the band 201 is let out to one side of the shaft and drawn up to the other side of the shaft, thus moving the yoke 200 and the tool holder in an opposite direction. This arrangement allows the tool holder to move in phase with the output shaft.

It will be appreciated that the band may comprise one connection only with one or other of the end parts of the yoke, return movement being, for example, by a tension spring connected between the other end of the band 201 and the yoke 200.

It will be appreciated that the machine tools described above with reference to the drawings can be used to machine on a surface of a workpiece, a surface profile which varies in distance from an imaginary reference in one or both of two mutually perpendicular directions. The variation of distance is governed by the maximum movement of the tool. For example, workpieces can be accurately and quickly machined to form a cam of purely cylindrical shape or frusto-conical shape with a very small cone angle or oval cross-section or elliptical cross-section. In addition, annular or quasi-circular grooves and channels can readily be machined in workpiece of the kind described above during a machining operation, the only limits being provided by the cutting force which can be applied by the machine tools and the range of movement of the tools.

In addition, bearing bores can be machined to have special features to accommodate housing deflection or to be tapered in an axial direction to have, for example, slightly bell-mouthed ends, to relieve edge loading. Further, bearing bores can be machined to shapes which conform to housing and shaft shapes thus obviating or reducing the need for the use of overlays. Cavitation erosion can be reduced by blending certain groove features in the bearing surface into the remainder of the bearing surface thus preventing cavitation at the joints between such grooves and the remainder of the beaing surface. Small end bushes with cut-aways leave shoulders which are not well held back against their housings due to local lack of circumferential hoop stress. Local relief of the bore near the shoulders can be provided to improve this. Thrust washers can be produced with radial grooves or compound tapers. Complex embossing tools can be cut as can profile, pressing and boring cups.

The numerical control system allows easy variation of the shape of workpieces and the speed and accuracy of cut allows rapid throughput of wprkpieces. The tools can be readily changed and the simple construction of the machines allows easy servicing and replacement of parts.

It will also be appreciated that, if desired, the movement of the tool holders in both directions can be by the cams and in this case the springs can be dispensed with. In this case, two cam contacting surfaces may be provided on diametrically opposite sides of the output shaft. The cam is symmetrical about a plane which includes the output shaft axis and which lies between the two cam contacting surfaces. The cam contacts both surfaces so that rotation of the cam in one sense causes outward movement of the tool holder and rotation of the cam in the opposite sense causes return movement of the tool holder.

It will further be appreciated that the tool holder need not be mounted for pivotal movement. For example, the tool holder may be mounted in bearings for reciprocating rectilinear movement.

The relative movement between the workpiece and the tool in a direction parallel to the axis of the workpiece need not be by movement of the carriage, it could be achieved by movement of the workpiece holder.

I CLAIM

1. A machine tool for turning or facing a surface of a workpiece rotating about an axis to a changing profile in two mutually perpendicular directions extending axially and radially of the rotating workpiece comprising:
   a rotatable workpiece support for holding and rotating the workpiece;
   a workpiece angular position transducer for producing a signal representing the angular position of the workpiece,
   a tool support carriage supported for movement along a translational axis which extends in one of said directions,
   a carriage position transducer for producing a signal representing the position of the carriage along the translational axis,
   a tool holder carried on said tool support carriage and supported for movement in the other of said directions,
   a tool holder position transducer for producing a feedback signal representing the position of the tool holder in the other of said directions,
   a control apparatus for receiving the workpiece angular position signal and the tool carriage position signal from said transducers and for generating a single varying control signal corresponding to required tool positions for workpiece angular and tool carriage positions represented by the transducer signals for the production of a predetermined changing non-uniform profile on a surface of the workpiece in the axial and radial directions,
   a single low-inertia high-torque motor for receiving a control current,
   a rotor of the motor which is rotated responsive to the control current by a maximum of less than a revolution and whose successive angular positions within said revolution correspond to instantaneous values of the control current,
   a rotor velocity signal generator for producing a feedback signal representing the angular velocity of the rotor,
   a closed loop control system for receiving the single varying control signal, the tool position feedback signal, and the rotor velocity feedback signal, and for producing therefrom the control current for said motor,
   a single element transfer member connected directly to the rotor and acting directly on the tool holder for translating angular movements of the motor output shaft with substantially no lag in the transmission of the shaft movements into corresponding movements of a tool held by the tool holder,
   the rotor, the transfer member, and the control system with feedback having together an overall system bandwidth of at least 150 Hz to move the tool to each required position during machining to machine the surface of the workpiece to the required non-uniform profile in said two directions.

2. A machine tool according to claim 1, wherein the single element drive transfer member comprises a cam carried on the rotor and having a cam surface in contact with the tool holder.

3. A machine tool according to claim 2, wherein the tool holder has a single cam-contacting surface urged into contact with the cam by spring means so that pivotal movement of the tool holder in one sense is caused by a forced from the cam and in the other sense by a force from the spring means.

4. A machine tool according to claim 2, wherein the tool holder has two cam-contacing surfaces arranged on diametrically opposed sides of the output shaft, the cam being symmetrically about a plane including the output shaft axis and lying between the two cam-contacting surfaces, the cam being simultaneously in contact with both cam-contacting surfaces so that rotation of the output shaft in one sense pivots the tool holder in one sense through one cam-contacting surface and in the other sense pivots the tool holder in the other sense through the other cam-contacting surface.

5. A machine tool according to claim 1, wherein the maximum movement of the tool is achieved by a rotation of the rotor by less than 10°.

6. A machine tool according to claim 1, wherein the single element drive transfer member comprises a flexible band wrapped tightly around the motor output shaft and fixed at one end to the tool holder so that rotation of the motor output shaft pivots the tool holder in one sense.

7. A machine tool according to claim 6, wherein a spring is provided for supplying a force to pivot the tool holder in a sense opposite to said one sense.

8. A machine tool according to claim 6, wherein the flexible band has two ends each fixed to an associated one of two tool holder parts arranged on diametrically opposite sides of the rotor so that rotation of the rotor in either sense pivots the tool holder in corresponding senses.

9. A machine tool according to claim 1, wherein the tool holder is mounted for reciprocating rectilinear movement only in a direction lying in a plane normal to the axis of rotation of the rotor and having a mounting for a tool at one end thereof and contacting the single element drive transfer member at or towards the other end.

10. A machine tool according to claim 1, wherein the tool holder includes mountings for two tools and wherein the tool holder is indexable between two positions in each of which a respective one of the tools is in an operative position.

11. A machine tool according to claim 1, wherein the maximum cutting force applied by the motor through the tool holder is 5 kg and the bandwidth of the system is 0–350 Hz.

12. A machine tool according to claim 1, wherein the tool holder is connected to said tool support carriage by pivot means for movement in the other of said directions.

13. A machine tool according to claim 12, wherein said pivot means comprise two pairs of flexible strips connected between the tool holder and the tool support carriage with the strips of each pair being arranged normal to one another and the two pairs of flexible strips defining a common pivotal axis.

14. A machine tool according to claim 12, wherein said tool holder comprises two arms rigidly connected at respective ends thereof and forming an acute angle therebetween and a support strut extending between the arms intermediate the ends thereof, said pivot means being connected at said connection between said two arms, one of said two arms being contacted by said drive transfer means and the other of said two arms carrying at least one tool.

15. A machine tool according to claim 14, wherein said transfer element-contracting arm carries a hardened plate which bears against said drive transfer element.

16. A machine tool according to claim 15, wherein said pivot means comprise two pairs of flexible strips connected between connected ends of the two arms and the tool support carriage arm, with the strips of each pair being arranged normal to one another and the two pairs of flexible strips defining a common pivotal axis.

17. A machine tool according to claim 14, wherein the tool support carriage includes an arm, the tool holder being suspended from said arm by said pivot means.

18. A machine tool according to claim 1 wherein said tool holder comprises a rigid framework of members including a central member mounted on the tool support carriage by a pivot, a further member extending from the central member at a point adjacent the pivot in a direction normal to the central member, and a connecting member extending from one end of the central member to an end of the further member remote from the central member and then to an end of the central member opposite said one end, a tool being mounted at said one end of said central member and said single element drive transfer member engaging the end of the central member opposite said one end.

19. A machine tool according to claim 1, wherein the control apparatus receives digital profile data which defines the required final profile of the workpiece and which is in the form of a sequence of required tool positions at a number of spaced angular positions of the workpiece for each of a succession of positions in said one of said directions and produces said varying control signal therefrom.

20. A machine tool for boring the interior of a hollow workpiece rotating about an axis to a non-cylindrical profile in axial and radial directions during relative rotation therebetween and comprising:
  a rotatable workpiece support for holding and rotating the workpiece,
  a workpiece angular position transducer for producing a signal representing the angular position of the workpiece,
  a tool support carriage supported for movement along a translational axis which extends in said axial direction,
  a carriage position transducer for producing a signal representing the position of the carriage along the translational axis,
  an elongate boring bar mounted intermediate the ends thereof for pivotal movement in said radial direction about an axis normal to the axis of rotation of the workpiece and carried on said tool support carriage,
  a tool carried at one end of the boring bar,
  a boring bar position transducer for producing a feedback signal representing the pivotal position of the boring bar,
  a control apparatus for receiving the workpiece angular position signal and the tool carriage position signal from said transducers and for generating a single varying control signal corresponding to required tool positions for workpiece angular and tool carriage positions represented by the transducer signals for the production of a predetermined non-cylindrical profile of the interior of the hollow workpiece in the axial and radial directions,
  a single low-inertia high-torque motor mounted adjacent an end of said boring bar opposite said one end for receiving a control current,
  a rotor of the motor which is rotated responsive to the control current by a maximum of less than a revolution and whose successive angular positions within said revolution correspond to instantaneous values of the control current, a rotor velocity signal generator for producing a feedback signal representing the angular velocity of the rotor, a closed loop control system for receiving the single varying control signal, the tool position feedback signal, and the rotor velocity feedback signal, and for producing therefrom the control current for sadi motor, a single element drive transfer member connected directly to the rotor of the motor and acting directly on said end of the boring bar opposite said one end for translating angular movements of the motor output shaft with substantially no lag in the transmission of the shaft movements into corresponding movements of the tool, the rotor, the transfer member, and the control system with feedback having together an overall system bandwidth of at least 150 Hz to move the tool to each required position during machining to bore the interior of the hollow workpiece to the required non-cylindrical profile in axial and radial directions.

21. A machine tool according to claim 20, wherein the single element drive transfer member comprises a cam carried on the rotor and having a cam surface in contact with the tool holder.

22. A machine tool according to claim 21, wherein the tool holder has a single cam-contacting surface urged into contact with the cam by spring means so that pivotal movement of the tool holder in one sense is caused by a force from the cam and in the other sense by a force from the spring.

23. A machine tool according to claim 21, wherein the tool holder has two cam-contacting surfaces arranged on diametrically opposed sides of the output shaft, the cam being symmetrically about a plane including the output shaft axis and lying between the two cam-contacting surfaces, the cam simultaneously in contact with both cam-contacting surfaces so that rotation of the output shaft in one sense pivots the tool holder in one sense through one cam-contacting surface and in the other sense pivots the tool holder in the other sense through the other cam-contacting surface.

24. A machine tool according to claim 20, wherein the maximum movement of the tool is achieved by a rotation of the output shaft by less than 10°.

25. A machine tool according to claim 20, wherein the control apparatus receives digital profile data which defines the required final profile of the workpiece and which is in the form of a sequence of required tool positions at a number of spaced angular positions of the workpiece for each of a succession of positions in said one of said directions and produces said varying control signal therefrom.

26. A machine tool according to claim 20, wherein said boring bar carries at said end opposite said one end a hardened plate which bears against said drive transfer element.

27. A machine tool for machining a surface of a workpiece rotating about an axis to a changing profile in two mutually perpendicular directions extending axially and radially of the rotating workpiece comprising:

a rotatable workpiece support for holding and rotating the workpiece, a workpiece angular position transducer means for producing a signal representing the angular position of the workpiece, a tool support carriage supported for movement along a translational axis which extends in one of said directions, a carriage position transducer means for producing a signal representing the position of the carriage along the translational axis, a tool holder on said tool support carriage and supported for movement in the other of said directions, a tool holder transducer means for producing a feedback signal representing the position of the tool holder in the other of said directions, control means for receiving the workpiece angular position signal and the tool carriage position signal from said transducer means and for generating a signal varying control signal corresponding to required tool positions for workpiece angular and tool carriage positions represented by the transducer means signals for the production of a predetermined changing non-uniform profile on a surface of the workpiece in the axial and radial directions, a single low-inertia high-torque motor for receiving a control current, a rotor of the motor which is rotated responsive to the control current by a maximum of less than a revolution and whose successive angular positions within said revolution correspond to instantaneous values of the control current, a rotor velocity signal generator means for producing a feedback signal representing the angular velocity of the rotor, a closed loop control system including means for receiving the single varying control signal, the tool position feedback signal, and the rotor velocity feedback signal, and for producing therefrom the control current for said motor, and a single element drive transfer member connected directly to the rotor and acting directly on the tool holder for translating angular movements of the motor output shaft with substantially no lag in the transmission of shaft movements into corresponding movements of a tool held by the tool holder, the rotor, the drive transfer member, and the control system with feedback providing a tool positioning means having together an overall system bandwidth of at least 150 Hz for moving the tool to each required position during machining to machine the surface of the workpiece to the required non-uniform profile in said two directions.

28. A machine tool according to claim 27, wherein the single element drive transfer member comprises a cam carried on the rotor and having a cam surface in contact with the tool holder.

29. A machine tool according to claim 28, wherein the tool holder has a single cam-contacting surface urged into contact with the cam by spring means so that pivotal movement of the tool holder in one sense is caused by a force from the cam and in the other sense by a force from the spring means.

30. A machine tool according to claim 28, wherein the tool holder has two cam-contacting surfaces arranged on diametrically opposed sides of the output shaft, the cam being symmetrically about a plane including the output shaft axis and lying between the two cam-contacting surfaces, the cam being simultaneously in contact with both cam-contacting surfaces so that rotation of the output shaft in one sense pivots the tool holder in one sense through one cam-contacting surface and in the other sense pivots the tool holder in the other sense through the other cam-contacting surface.

31. A machine tool according to claim 27, wherein the maximum movement of the tool is achieved by a rotation of the rotor by less than 10°.

32. A machine tool according to claim 27, wherein the single element drive transfer member comprises a flexible band wrapped tightly around the motor output shaft and fixed at one end to the tool holder so that rotation of the motor output shaft pivots the tool holder in one sense.

33. A machine tool according to claim 32, wherein a spring is provided for supplying a force to pivot the tool holder in a sense opposite to said one sense.

34. A machine tool according to claim 32, wherein the flexible band has two ends each fixed to an associated one of two tool holder parts arranged on diametrically opposite sides of the rotor so that rotation of the rotor in either sense pivots the tool holder in corresponding senses.

35. A machine tool according to claim 27, wherein the tool holder is mounted for reciprocating rectilinear movement only in a direction lying in a plane normal to the axis of rotation of the rotor and having a mounting for a tool at one end thereof and contacting the single element drive transfer member at or towards the other end.

36. A machine tool according to claim 27, wherein the control means receives digital profile data which defines the required final profile of the workpiece and which is in the form of a sequence of required tool positions at a number of spaced angular positions of the workpiece for each of a succession of positions in said one of said directions and produces said varying control signal therefrom.

37. A machine tool according to claim 27, wherein the tool holder includes mountings for two tools and wherein the tool holder is indexible between two positions in each of which a respective one of the tools is in an operative position.

38. A machine tool according to claim 27, wherein the maximum cutting force applied by the motor through the tool holder is 5 kg and the bandwidth of the system is 0-350 Hz.

39. A machine tool according to claim 27, wherein said tool holder comprises a rigid framework of members including a central member mounted on the tool support carriage by a pivot, a further member extending from the central member at a point adjacent the pivot in a direction normal to the central member, and a connecting member extending from one end of the central member to an end of the further member remote from the central member and then to an end of the central member opposite said one end, a tool being mounted at said one end of said central member and said single element drive transfer member engaging the end of the central member opposite said one end.

40. A machine tool according to claim 27, wherein the tool holder is connected to said tool support carriage by pivot means for movement in the other of said directions.

41. A machine tool according to claim 40, wherein said pivot means comprise two pairs of flexible strips connected between the tool holder and the tool support carriage with the strips of each pair being arranged normal to one another and the two pairs of flexible strips defining a common pivotal axis.

42. A machine tool according to claim 40, wherein said tool holder comprises two arms rigidly connected at respective ends thereof and forming an acute angle therebetween and a support strut extending between the arms intermediate the ends thereof, said pivot means being connected at said connection between said two arms, one of said two arms being contacted by said transfer means and the other of said two arms carrying at least one tool.

43. A machine tool according to claim 42, wherein said transfer element-contacting arm carries a hardened plate which bears against said transfer element.

44. A machine tool according to claim 43, wherein said pivot means comprise two pairs of flexible strips connected between ends of the two arms and the tool support carriage arm, with the strips of each pair being arranged normal to one another and the two pairs of flexible strips defining a common pivotal axis.

45. A machine tool according to claim 42, wherein the tool support carriage includes an arm, the tool holder being suspended from said arm by said pivot means.

* * * * *